TELEGRAPH TRUNK AND CONTROL CIRCUITS

Filed Dec. 22, 1950 2 Sheets-Sheet 1

INVENTORS L. A. GARDNER
W. T. REA
BY
John E. Cassidy
ATTORNEY

TELEGRAPH TRUNK AND CONTROL CIRCUITS

INVENTORS: L. A. GARDNER
W. T. REA
BY
John E. Cassidy
ATTORNEY

Patented May 19, 1953

2,639,320

UNITED STATES PATENT OFFICE 2,639,320

TELEGRAPH TRUNK AND CONTROL CIRCUITS

Leland A. Gardner, Summit, N. J., and Wilton T. Rea, Manhasset, N. Y., assignors to Bell Telephone Laboratories, Incorporated, New York, N. Y., a corporation of New York Application December 22, 1950, Serial No. 202,208

8 Claims. (Cl. 178—2)

Figure 1:
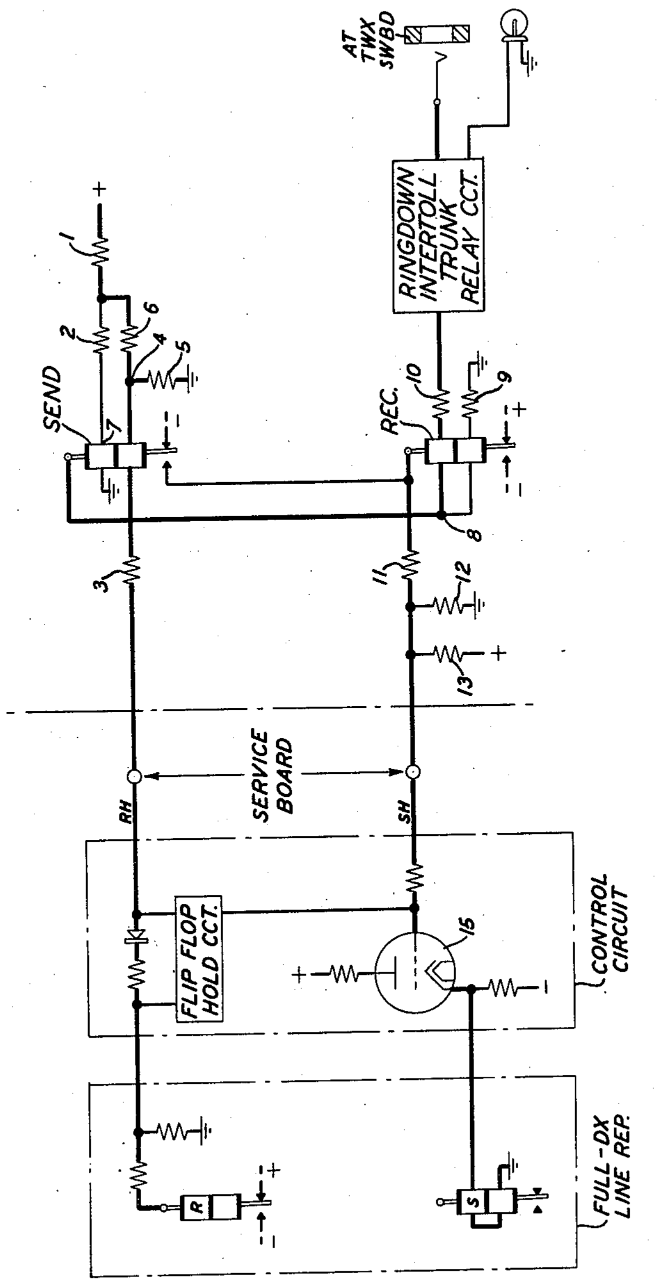

As is well known in the telegraph industry, in addition to telegraph switching systems which are generally comparable to telephone switching systems in that telegraph subscribers connected thereto may call other subscribers through manual or automatic switching offices and be connected to the called subscriber, usually for a relatively short period, there is, among other kinds of service, one in which the telegraph stations or patrons subscribing thereto are usaully interconnected for longer periods such as for days or weeks or longer. Such connections may involve a number of patrons, such as different subdivisions of a large corporation, located in different cities who have need of long periods of telegraph communication between the different units. Such connections were formerly established at telegraph testboards and required in addition certain adjustments at the repeater relay rack bays in the telegraph repeater station by the telegraph repeater attendants, but more recently due to the development of new circuits and the introduction of new operating methods the connections may be established at fixed operating positions through what is known in the industry as a telegraph service board. In such service, designated patrons in an individual local area are interconnected by means of what are called concentration groups and then the groups in the various local areas are formed into an over-all network by means of telegraph lines interconnecting the various concentration groups.

Because of the nature of the operating methods the circuits provided in the telegraph service board are quite different from those provided in an ordinary telegraph testboard. The principal feature of the interconnecting circuits is an arrangement whereunder each individual telegraph line between cities or telegraph loop to a subscriber's station which is to be connected into a concentration group is equipped with an individual telegraph repeater of a special form known as a hub repeater which is arranged so that the local or interconnecting branch of each repeater forms a spoke, as it were, all of which are joined in what is termed a hub. All of the branches so connected are joined in parallel to the hub. Any one of the circuits may transmit through the hub to all of the others simultaneously. However, only one spoke may transmit at a time through a single hub. Branches may be added to or subtracted from a concentration group without the necessity for compensating for the change in the remaining circuits of the group. The circuits may, therefore, be administered at a switchboard by operators in a manner somewhat resembling a manual telegraph switchboard although the operation is quite different. The switchboard is known as a telegraph service board.

Although it was feasible to change the arrangements of private line service, as such service is known, so that it could be administered at a switchboard, because of the fact that the connections are in a sense semipermanent, and little switching of the circuits is therefore required, it was not feasible to provide such facilities as are ordinarily provided at the usual telegraph switching central office, such as operators' cords and trunks with their supervisory and ringing features in the case of a manual control telegraph exchange or to provide link, director and selector circuits as in the case of a central mechanical telegraph exchange.

In private line service the network may be first established by making use of complementary communication facilities extending between cities, such as by means of one or two spare lines which interconnect facilities at the service board in the different cities. The necessary information to establish a network will be passed over such spare or common facilities and the network and concentration group is arranged so that when it is established it does not include expensive flexible connections as enumerated above. In short, telegraph service board service is required to be relatively inexpensive and the circuits are designed to take into consideration the relatively small amount of switching which is required.

As a telegraph service board is arranged, there are ordinarily therein a considerable number of telegraph lines equipped with line repeaters and extending to a number of other service boards in different cities. Many of these lines will at a particular time be in use serving as a branch of some private line concentration network. Others will be spare and available for use as additions to or substitutions in presently established concentration networks, or in the formation of new private line networks, or will be employed for telegraph central office switching by the operators in passing information relative to the establishing or administration of connections such as in a telegraph exchange system. In order to afford desired flexibility and operating advantages each of the lines, whether in use or spare, as well as each of the loops which may be connected into a concentration is required to be equipped with a hub-type repeater so that it may serve in a concentration. In the case of the electronic type, this requires that each such line be equipped with an electronic control circuit to prevent retransmission of signals originating in one spoke of the hub, back toward their source, and to perform other functions.

In addition to serving as a means for establishing concentration groups of private line networks, the service board is used also for testing and maintaining the telegraph lines of which such concentrations are formed as well as for testing and maintaining the telegraph trunks extending to the telegraph switching offices in an exchange system. In order to permit this flexibility and universal usage all such lines and trunks are arranged to extend through a telegraph service board. A telegraph service board is therefore located generally in the same building with a telegraph switching exchange. Recently, it has been decided, in one large telegraph system, to equip all telegraph lines, both those which will be employed in concentration groups and terminated therefore at the telegraph service board, and those which extend through the board for connection to trunks terminating at a telegraph switching office, with electronic control circuits. This affords flexibility and makes it possible to employ any line so equipped as part of a concentration group in a private line network or as a line in an exchange switching system.

In addition, therefore, to private line concentration groups at a service board, involving three or more branches, each requiring for such operation an individual repeater and hub electronic control circuit, there are required to be established and supervised also at each service board large numbers of through connections involving only two circuits, namely, a telegraph line equipped with its repeater and its control circuit on the incoming side of the service board and on its outgoing side a trunk to a telegraph exchange switchboard. If circuits were to be designed especially for such two-circuit through connection only, it would not be required to equip each one of the two circuits individually with the control apparatus of a hub-type repeater. However, when one of the circuits, interconnectible as one of the two circuits of a two-circuit through connection, is required to be arranged so that it may at times serve interchangeably as part of a multicircuit hub repeater concentration at the service board, such one circuit would be required to be equipped with the control feature of a hub telegraph repeater so that it could serve in a concentration group when required.

All telegraph lines, as distinguished from trunks, connected to the service board are, for the sake of flexibility, to be equipped with hub-type repeaters and in the more recently developed boards are each to be equipped with electronic control circuits. It would represent a considerable saving if it were possible to interconnect a relay trunk to a telegraph line, which line has an electronic control circuit, in such manner that it were not necessary to provide an electronic control circuit individual to the trunk in addition to the electronic control circuit which is to be provided individual to the line repeater. If such an arrangement were possible, that is, to work in each direction between the line and the trunk, while employing only the one electronic control circuit which is required in the line, and arranging the relay trunk so that it did not also require an individual electronic control circuit, considering the relatively large number of trunks extending through each service board it would achieve substantial economy.

On the other hand, if each of the many trunk circuits extending through each service board were required to have an individual electronic control circuit before it could function with a line repeater and its associated electronic control circuit in a service board, the economic feasibility of the system would be dubious.

An object of the present invention is the improvement of telegraph service board circuits.

A more particular object of the present invention is the provision of an arrangement whereby a magnetic relay telegraph trunk circuit will not require an individual electronic or other control circuit, for interconnection to a telegraph line repeater which is equipped with an individual electronic control circuit, so that the line repeater and control circuit may, when disconnected from the trunk, serve at times as a spoke of a multi-circuit hub repeater concentration.

There are two different kinds of well-known magnetic relay telegraph trunk circuits which are to be connected in large numbers through telegraph service boards to telegraph lines. One of these is a ringdown intertoll trunk relay circuit operating on a half-duplex basis. Such a circuit is disclosed in Patent 2,024,581 granted to Kinkead et al., December 17, 1935, and more specifically in Fig. 2 of the drawings thereof. The other is an automatic signaling magnetic relay intertoll trunk circuit which operates on a full-duplex basis and which may be employed, for instance, to interconnect a teletypewriter line concentrating unit or satellite exchange, as it is otherwise known, through a telegraph service board to a master office. Teletypewriter line concentrating units or satellite exchanges including automatic signaling trunks are well known in the art being described, for instance, in the patent to Kinkead et al., 2,340,599, granted February 1, 1944. The present invention proposes means whereby these two types of magnetic relay trunks may be connected through a service board, to their respective line repeaters each equipped with an electronic control circuit and in such manner that the magnetic relay trunks need not be equipped also with an individual electronic control circuit. The line repeater and its associated control circuit may therefore be connected interchangeably at the service board into a private line concentration group or be employed to extend the magnetic relay trunks to the adjacent teletypewriter switching office.

The invention may be understood from the following description when read with reference to the associated drawings which taken together disclose preferred specific embodiments in which the invention is presently incorporated, although it is to be understood that the invention is not so limited, but may be incorporated in a number of other embodiments which will be readily suggested by the present disclosure to those skilled in the art.

Figure 2:
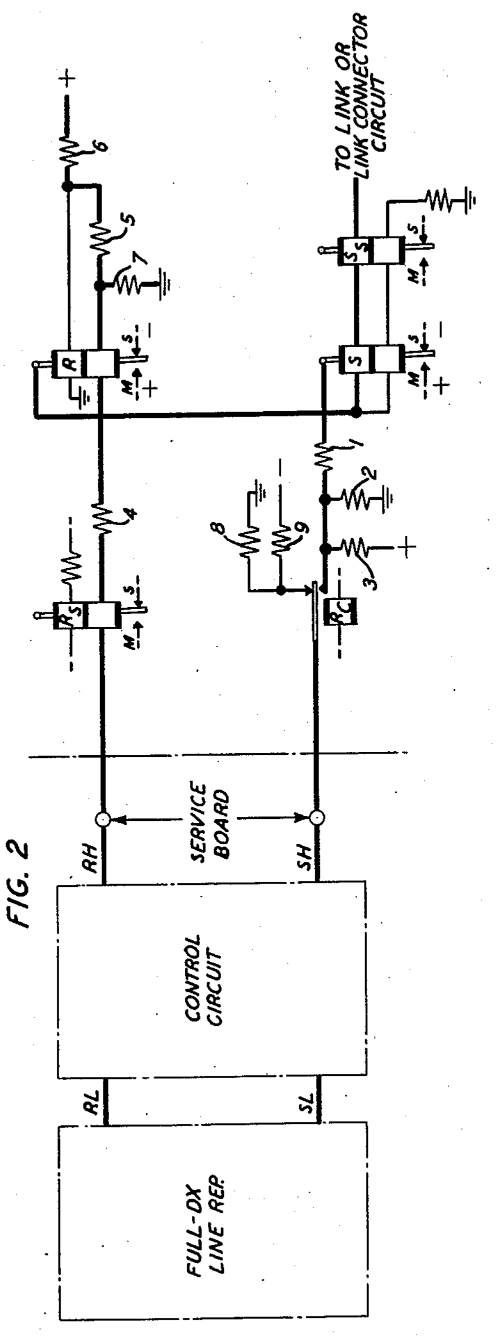

In the drawings:

Fig. 1 shows one embodiment of the present invention in which a two-circuit through connection is established at the telegraph service board between a full-duplex line repeater equipped with one electronic control circuit directly to a magnetic relay half-duplex ringdown intertoll trunk circuit extending from the service board to a teletypewriter exchange switchboard;

Fig. 2 shows a second embodiment of the invention in which a two-circuit through connection is established at the telegraph service board between a full-duplex line repeater equipped with one electronic control circuit directly to a magnetic relay full-duplex automatic trunk extending through a line concentrator or satellite exchange as it is known and a link or link connector circuit to a remote subscriber station.

Figure 3:
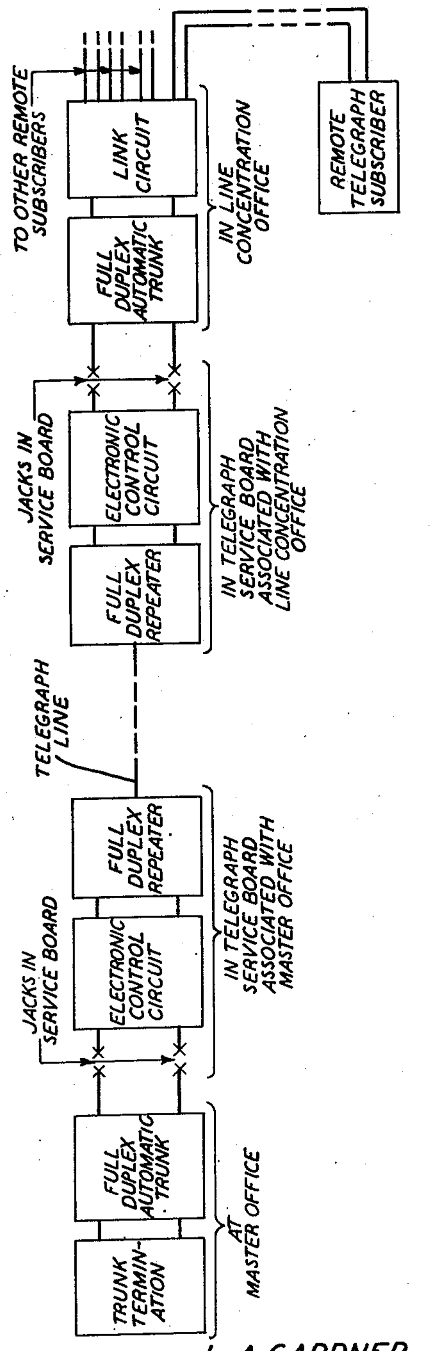

Fig. 3 shows schematically, by means of connected rectangles with captions, how telegraph subscribers remote from a telegraph switching exchange are connected through a line concentrator or satellite exchange by means of a full-duplex automatic signaling trunk which is extended through a telegraph service board at both the concentrator office and master office.

*Embodiment per Fig. 1*

Refer now to Fig. 1 which shows schematically a full-duplex line repeater having a receiving relay R and a sending relay S, enclosed within the left-hand rectangle, connected by means of two conductors to a control circuit, enclosed within another rectangle to the right of the full-duplex line repeater. As ordinarily employed heretofore, the full-duplex line repeater and the control circuit taken together, as shown, are well known components of a single cooperating hub repeater unit which may be interconnected with other similar units so that each unit forms a branch of a hub concentration group at a telegraph service board. In the present case instead of the usual hub circuit arrangement, in which three or more line repeaters and their individual control circuits are joined through a hub, the single full-duplex repeater and its individual control circuit are connected through a special repeater of the present invention directly to a ringdown intertoll trunk relay circuit, well known in the art and indicated by a rectangle, to a teletypewriter exchange switchboard. Thus a telegraph line with its repeater and control circuit are joined in this case to a telegraph trunk to form a through circuit extending through the service board. This arrangement permits trunks between teletypewriter exchange switchboards in different cities to extend through the service board at each city where they may be tested and maintained and permits tandem connections of each trunk through a control circuit and line repeater to a line to a distant city for teletypewriter switchboard exchange service as distinguished from private network service. The connection between the trunk and the control circuit may be opened at the telegraph service board in either city and the control circuit, line repeater and line may be connected into a hub concentration group to serve in private wire service, instead of being connected to a single trunk to a teletypewriter exchange switchboard. The disconnected trunk in such case may be connected to another line facility extending to the same or to a different distant city as traffic may require. The important aspect of the arrangement is that a line equipped with a repeater and a hub repeater control circuit which ordinarily would be joined as a spoke of a hub repeater concentration group at the service board is employed instead in a tandem connection with a trunk, which extends through the service board to a teletypewriter exchange switchboard. The hub spoke of the so-called electronic type operates on a ptoential basis and the trunk operates on a current basis. When spokes of a hub are joined into a concentration group, each spoke has an individual thermionic control circuit, so that each can be operative in a potential controlled group. In the present arrangement, the current controlled trunk is not required to be equipped with an individual thermionic control circuit in order to function in the tandem connection to the potential responsive control circuit and this is the most important aspect of the invention.

Preliminary to a description of the operation of the present arrangement, a general description of how a hub repeater and electronic control circuit function in the usual hub concentration group will be given, so as to afford a better understanding of the present invention. Hub repeater and electronic control circuits are well known in the art being described for instance in patent application Serial No. 67,996 now U. S. Patent No. 2,608,619 dated August 26, 1952, filed by J. R. Davey and W. T. Rea, December 29, 1948, to which reference can be had, if desired, for a more detailed description of the line repeater and control units when employed in the usual hub repeater concentration, of which a general description here is considered adequate for the present purpose.

In usual operation when hub repeater units are joined into concentration groups at a telegraph service board all of the receiving or RH leads, one for each unit employed, are joined in parallel to a receiving hub and are connected either directly or through a regenerative repeater to all of the sending or SH leads, which are connected in parallel to a sending hub. When no regenerative repeater is employed, the joined receiving hub and sending hub, electrically, constitute a single point called the hub of the hub repeater concentration.

When in the marking or idle condition, in a hub concentration, each of the relays corresponding to relay R will be in engagement with its marking contact. This will produce a first predetermined or marking potential on the hub. This marking potential will be impressed on the sending legs corresponding to SH in each unit of the concentration. In response to this, the sending relay S in each unit will engage its marking contact. If a spacing signal is received from any one unit, the receiving relay R in that unit will be operated to engage its spacing contact. In response to this the potential of the hub will be changed to a second predetermined or spacing potential which is impressed on the sending leg in each unit and operates the sending relay S in each unit, other than the unit from which the signal is being received, to engage its respective sending contact so as to transmit a spacing signal.

The spacing signal received by the one unit and transmited toward the hub must be prevented from being transmitted back toward its source. This is the primary function of the control circuit directly connected with each unit.

When a spacing signal is received by a particular unit, the control circuit forming a part of that unit applies a hold to its sending leg thus preventing the spacing signal from being transmitted back through the same unit.

Message signals can be effectively passed from any one unit only at any one time through one hub. At times two units may attempt to transmit. In response to the reception of two spacing signals simultaneously by the hub from two units, which attempt to send simultaneously, a third predetermined potential is impressed on the hub known as the double-space potential. In response to this all control circuits are unlocked and the random garbled signals produced on the hub will be transmitted through the sending legs of all units as an indication of the condition and a sign that all transmission should be momentarily suspended. Thereafter one party may resume transmission.

The principal means employed in the electronic control circuit to effect the foregoing controls is a so-called flip-flop circuit which resembles a multivibrator including an input circuit having several cooperating branches which discriminates between the several potential conditions impressed on the receiving hub.

It should be apparent from the foregoing that an individual control circuit is a necessary element of each hub repeater unit branch. In a multiunit concentration group comprising three or more hub repeater unit branches, a control circuit is required for each unit. If each line repeater in a service board is to be equipped with an electronic control circuit, so that all line repeaters in the service board are to be readily available for service in a concentration group, since a hub concentration comprising electronic control circuits operates on a potential, rather than a current basis, it would appear that, when two circuits are arranged to form a through connection at the service board, one of which circuits is a line repeater with its permanently connected electronic control circuit, which line repeater is connected to a distant office, and the other of which circuits is a magnetic relay trunk circuit, terminating at an adjacent teletypewriter switching exchange, which magnetic relay trunk operates on a current basis, it would be necessary to equip the relay trunk circuit also with an individual electronic control circuit. To so equip each of the relay trunk circuits extending through the service board, so that it may be tested and maintained with an individual electronic control circuit, in the interest of flexibility of the unit comprising the line repeater and its connected electronic control circuit, since there are large numbers of relay trunks, would be prohibitively expensive. The present invention makes it possible to connect a line repeater equipped with an individual electronic control circuit directly to a magnetic relay trunk circuit so as to form a through connection at the service board, without having to provide an individual electronic control circuit also for the relay trunk.

*Transmitting from a telegraph service board to a teletypewriter switchboard, Fig. 1*

The operation of the circuit per Fig. 1 will now be described in detail.

The circuit per Fig. 1 is shown in the marking condition. For this condition the armature of each of the relays is in engagement with its marking contact as shown. When the receiving relay R in the full-duplex line repeater is in engagement with its marking contact, positive battery is connected through the right-hand or marking contact and armature of relay R. It will be observed that positive battery is also connected to the other extremity of this connection, that is to the right-hand terminal of resistance 1. The magnitude of each battery is the same and the magnitude of the resistance components are so chosen that for this condition no current flows through the RH lead and through the bottom winding of relay SEND. A positive marking potential is impressed on the RH lead and on the control circuit which is the same in magnitude as the normal marking potential of the hub when the full duplex line repeater and control circuit are connected to a hub group. A path may be traced from positive battery through resistance 1, resistance 2 and the top winding of relay SEND to ground. The effect of this current flowing through the top winding, tends to actuate the armature of relay SEND to engage its right-hand or marking contact and since it is unopposed the armature of relay SEND will be in engagement with its right-hand or marking contact as shown. When a spacing signal is received by relay R in the full-duplex repeater, the armature of relay R is actuated to engage with its left-hand or spacing contact which connects negative battery to the armature of relay R. As a result of this spacing potential is applied to the RH lead at the service board and this spacing potential may be for instance −60 volts. The negative 60-volt potential is the potential normally produced on the receiving hub of a hub repeater concentration group employing electronic repeaters in response to a double space condition. The double space potential unlocks the hold on all sending leads, such as SH in such a group and is effective in the present case to unlock the single lead SH in Fig. 1. The object of this is to permit any break signal received through the ringdown trunk to pass. This is explained more fully under the heading "Break feature, Fig. 1" hereinafter. The spacing signal from relay R causes a spacing current which may be for instance 18 milliamperes to flow through resistance 3, the bottom winding of relay SEND to junction 4 of the potentiometer formed by resistances 5 and 6. One branch of this circuit extends through resistance 6 and resistance 1 to positive battery and the other branch extends through resistance 5 to ground. As a result of this current flow, which overpowers the current in its top winding, the armature of relay SEND is operated to its spacing contact by the current of approximately 18 milliamperes flowing in its bottom winding.

The armature of relay SEND connects to the apex 8 of relay REC. When relay SEND is on its marking contact negative telegraph battery which may be for instance 48 volts, is connected through the armature of relay SEND to the left-hand terminals of the top and bottom windings of relay REC. This causes a current which may be for instance approximately 10 milliamperes to flow through the bottom winding of relay REC and resistance 9 to ground. This current is in a direction to tend to operate the armature of relay REC toward its left-hand or spacing contact. At the same time assuming a marking condition is present towards the cord circuit, not shown, connected to the jack at the teletypewriter switchboard, at the lower right of Fig. 1, a current which may be for instance approximately 20 milliamperes flows in the top winding of relay REC and through resistance 10 and the ringdown intertoll relay circuit, indicated by a rectangle, to the teletypewriter switchboard, where it is terminated in positive telegraph battery which may be for instance 48 volts in the connected cord circuit repeater at the switchboard. This current is in a marking direction and since its effect is dominant, the armature of the R relay is held in engagement with its right-hand or marking contact by a net current which may be for instance approximately 10 milliamperes.

When the armature of relay REC is on its marking contact and the armature of relay SEND is operated to engage its spacing contact, as described, a circuit may be traced from the right-hand or marking contact of relay REC to which positive 48-volt battery, for instance, is connected through the left-hand or spacing contact and armature of relay SEND to the apex 8 of the REC relay. This reverses the direction of the flow of current through the bottom winding of relay REC which now, therefore, tends to maintain its armature in engagement with its right-hand or marking contact and since the termination in the cord at the teletypewriter switchboard will remain unchanged and positive battery of the same magnitude is connected to each extremity of the circuit through the top winding of relay REC, no current will flow therethrough. Since the effect of the current in the bottom winding is, therefore, unopposed, the armature of relay REC will be maintained in engagement with its right-hand or marking contact. Thus 18-milliampere inverse neutral telegraph signals are received by relay SEND on lead RH and retransmitted to the teletypewriter switchboard as 20-milliampere neutral signals through the REC relay which does not respond since it is arranged for balanced loop operation.

*Transmitting from a teletypewriter switchboard to a telegraph service board, Fig. 1*

When a marking signal is transmitted from a teletypewriter switchboard, positive telegraph battery, which may be for instance 48 volts, is applied through the cord, not shown, and the teletypewriter switchboard jack at the lower right through the intertoll trunk relay circuit, resistance 10, top winding of relay REC and the armature and right-hand or marking contact of relay SEND to negative 48-volt battery. For this condition, a marking current, which may be for instance approximately 20 milliamperes, flows through the top winding of relay REC and its effect preponderates over the effect of a current, which may be for instance 10 milliamperes, flowing through the bottom winding of relay REC, from negative battery connected to the armature of relay SEND. As a result of this the armature of relay REC will engage its right-hand or marking contact.

When a spacing signal is transmitted from the teletypewriter switchboard, negative battery, which may be for instance 48 volts, is applied through the teletypewriter switchboard jack and the intertoll trunk relay circuit. Since the armature of relay SEND is in engagement with its right-hand or marking contact, and negative 48 volts is assumed to be connected thereto, no current will flow through the top winding of relay REC for this condition. The armature of relay REC will, therefore, be actuated to engage with its left-hand or spacing contact by the effect of the biasing current which it is assumed is 10 milliamperes flowing through the bottom winding of relay REC.

The armature of relay REC is connected to the SH lead through resistance 11. The marking contact of relay REC is connected to positive battery, which may be for instance 48 volts, and the spacing contact to negative battery, which may be for instance 48 volts. Another circuit from the SH lead may be traced through resistance 12 to ground and resistance 13 to positive battery, which may be for instance 130 volts. Resistances 11, 12 and 13 form a potentiometer which causes the potential of the SH lead to be approximately positive 60 volts, for instance, when relay REC is on its marking contact and approximately negative 30 volts, for instance, when the armature of relay REC is on its spacing contact. Thus, 20-milliampere neutral signals received from the teletypewriter switchboard are retransmitted to the telegraph service board as positive 60 volts, for instance, for marking and negative 30 volts, for instance, for spacing. Space discharge device 15, in the control circuit, and relay S, in the full-duplex repeater, will follow these signals.

*Break feature, Fig. 1*

When the armature of relay SEND is on its right-hand or marking contact and a break signal is transmitted from the teletypewriter switchboard, no current flows through the top winding of relay REC and its armature is therefore actuated to engage with its spacing contact as described, due to the effect of the 10-milliampere biasing current flowing in its bottom winding from the negative battery, which may be for instance 48 volts, connected to the marking contact of relay SEND. Since the spacing contact of relay SEND is connected to the armature of relay REC, it should be apparent that when the armature of relay REC is actuated to engage with its spacing contact, negative telegraph battery, which may be for instance 48 volts, is applied to the spacing contact of relay SEND. Therefore, since both the marking and spacing contacts of relay SEND are connected to negative 48-volt battery, the armature of relay REC will remain on its spacing contact as long as a break signal is being transmitted from the teletypewriter switchboard regardless of whether or not a signal is received from the full-duplex line repeater by relay SEND. Thus, a break signal received from the teletypewriter switchboard is retransmitted over the SH lead to the telegraph service board.

Attention is called to the fact that whenever a spacing signal is received from the full-duplex line repeater in the arrangement per Fig. 1, the voltage which is produced on the RH terminal at the service board is the same as that produced at the receiving hub for the condition whereunder more than one full-duplex line repeater attempt to transmit simultaneously toward the receiving hub in a multicircuit hub concentration group. As explained in the foregoing, when this double-space potential condition as it is called is produced on a receiving hub, every control circuit in the hub concentration unlocks its associated sending leg to permit garbled signals produced by the double-space signals to be transmitted over each SH leg as an indication of the condition. In the present case the double-space potential condition is produced in response to a single-space signal received by the RH terminal. The objective is to permit any break signal existing on terminal SH to pass.

*Embodiment per Fig. 2*

The arrangement per Fig. 2 shows at the left a full-duplex repeater and control circuit, the same as in Fig. 1, and at the right a modification of a well-known magnetic relay automatic signaling trunk. Such trunks are presently employed in connecting line concentrators or satellite exchanges, as they are known, to master offices. They are described in patents identified in the foregoing particularly in Patent 2,340,599, granted to Kirkead et al., July 22, 1943.

Before describing the embodiment per Fig. 2 reference may be had to Fig. 3 for an understanding of how the embodiment per Fig. 2 is connected into a system.

Fig. 3 shows in captioned rectangles, at the right, a remote subscriber station. It is one of a number of such stations which are so remote from a central teletypewriter switching station, called the master station, that instead of being connected directly thereto, they are connected instead to an intermediate automatic office known as a line concentrator or satellite office. The several remote subscriber stations are connected to an automatic link circuit at the satellite exchange. The link circuit operates to establish a connection from any calling line automatically through one of a number of full-duplex automatic trunks. Associated with the satellite office in accordance with this invention will be a telegraph service board through which the automatic trunks will extend. At the service board, each of the trunks will be connected to an electronic control circuit and then through a full-duplex telegraph repeater to a telegraph line. The line will extend toward the position of the master office but first will pass through another full-duplex line repeater and electronic control circuit and appear in a telegraph service board. After passing through the service board it will pass through the master office switchboard end of the full-duplex automatic trunk and then to the trunk termination at the teletypewriter switchboard in the master office.

It may be observed that each end of the telegraph line between the service boards is equipped with a full-duplex repeater and an electronic control circuit before it appears in jacks at the service board. The telegraph line and its electronic control circuit may if desired be used for either of two purposes, namely, to interconnect the automatic trunk equipment at the concentrator with the automatic trunk equipment at the teletypewriter switchboard in the master office or may when disconnected from the trunk be employed at each service board as one of the spokes of a hub concentration group.

In Patent 2,340,599, the automatic trunk, which is to be modified in accordance with the right-hand portion of Fig. 2 herein, is shown in Figs. 11 and 13. More specifically, relays SS, S and RC are identified as relays 1101, 1110 and 1104, respectively, in Fig. 11 of the patent and relays R and RS are identified as relays 1302 and 1312, respectively, in Fig. 13 of the patent. The automatic trunk circuit at the line concentrator office aside from the fact that it connects to the link circuit is substantially the same as the automatic trunk circuit to which it connects at the master office and the trunk circuit at the master office is shown in Fig. 19 of Patent 2,340,599. More specifically relays SS, S, RC, R and RS in Fig. 2 correspond to relays 1940, 1941, 1921, 1919 and 1900 in Fig. 10 of Patent 2,340,599.

The detailed operation of the trunk is described in Patent 2,340,599 which is hereby incorporated by reference as though set forth in full herein. It is considered that a detailed description of the modifications to permit the automatic trunk to function with a telegraph line equipped with a full-duplex repeater and its electronic control circuit is all that will be required for an understanding of the invention per the embodiment per Fig. 2.

The five relays shown in the right-hand portion of Fig. 2 comprise essentially the loop repeater portion of the automatic signaling trunk. The supervisory and signaling circuit in the automatic signaling trunk is not affected by the requirement that the automatic signaling trunk be connected to a control circuit except that (1) the top or biasing winding of the receive supervision relay RS should be of a value suitable for the receiving hub RH currents (2) the armature circuit of the S relay requires a potentiometer comprising resistance 1, connected through the armature of relay S to either positive or negative battery, resistance 2, connected to ground, and resistance 3, connected to positive battery, to apply the required voltage swings to the sending hub lead SH, (3) a potentiometer, comprising resistances 4, 5 and 6 connected between the receiving hub lead RH and positive battery and resistance 7 connected between the left-hand terminal of resistance 5 and ground is connected to the R relay to apply the proper receiving hub marking potential to the receiving hub lead RH, and (4) relay RC, which is a supervisory relay employed to impose the idle space condition, since automatic signaling trunks are spacing when idle, will require a negative potential at its back contacts. This is produced by resistances 8 and 9 connected between negative battery and ground and having their junction connected to the upper or back contact of relay RC. An incoming space from the full-duplex line repeater through the control circuit produces the potential characteristic of a double-space condition on the receiving hub lead RH in the control circuit. In response to this the control circuit will be unlocked each time a space is received from the full-duplex repeater. The control circuit as explained in the foregoing is always unlocked while a marking signal element is being received. When serving in a hub concentration group, it is locked in response to a spacing signal incoming from the receiving relay in its own full-duplex repeater so as to maintain the sending relay connected to the associated SH lead in the same full-duplex repeater in the marking condition. When serving in a hub concentration group, as also explained in the foregoing, when two spaces are received simultaneously by the hub, a characteristic potential called the double-space potential is produced on the hub. In the present case, as in the first embodiment, the potential characteristic of the double-space condition for a hub concentration group is produced in response to the reception of a single space and the control circuit is deceived as it were into unlocking its associated sending leg for a single space incoming from its own receiving relay in the line repeater. This permits full-duplex operation and makes it possible for the control circuit to function with the full-duplex automatic trunk. In other words, the sending leg of the line repeater and control circuit when serving in connection with an automatic signaling trunk is always open for the passage of signals. It is normally open when idle or for a marking signal incoming from its line repeater and it is open due to the double-space potential produced whenever a single spacing signal is received from the line repeater. No break feature is required since the operation is full-duplex.

What is claimed is:

1. In a direct-current telegraph system, a telegraph line, a direct-current telegraph repeater and a transmission direction regulating circuit, having a space discharge control element therein, all interconnected to form a single two-way transmitting branch unit of a direct-current telegraph hub repeater concentration group, so as to be interconnectable at a first time with a plurality of other such units to form a telegraph repeater hub concentration group, having potential responsive transmission direction controls, a single magnetic relay telegraph trunk circuit, said unit connectable to said trunk circuit at a second time, and a potentiometer in said trunk circuit responsive to the transmission of telegraph signals between said single unit and said single trunk so as to control said control circuit to regulate the passage of said signals.

2. In a direct-current telegraph system, a single transmission direction control circuit, having space discharge elements therein, for a branch of a hub telegraph repeater concentration, said space discharge elements interconnected as a flip-flop circuit for discriminating between differing potentials applied to said control circuit, a magnetic relay trunk circuit connected to said control circuit and instrumentalities in said trunk circuit responsive to telegraph signals impressed on said trunk circuit for impressing proper potentials on said control circuit to regulate telegraph transmission between said circuits.

3. In a direct-current telegraph system, a single unit communication branch of a direct-current hub telegraph repeater concentration group, said branch having connected thereto potential discriminating transmission direction controls, a single direct-current telegraph trunk circuit including a telegraph repeater, said branch connectable alternatively to said trunk circuit to form an operable telegraph channel through said single branch and said single trunk.

4. In a direct-current telegraph system, a full-duplex direct-current telegraph repeater circuit, a potential responsive transmission direction regulating hub repeater control circuit, said control circuit having a space discharge device therein as the potential responsive element, a receiving hub lead and a sending hub lead interconnecting said circuits, said leads connectable at a first time to a plurality of other such leads in such circuits to form a telegraph hub repeater concentration group, a magnetic relay telegraph trunk circuit, said leads operatively connectable at a second time to said trunk circuit.

5. In a direct-current telegraph system, a ring-down telegraph trunk circuit, having a magnetic relay loop repeater connected thereto, a conductor extending from said loop repeater connectable to another telegraph circuit and a potentiometer connected to said conductor so as to impose potential controls on said other circuit.

6. In a direct-current telegraph system, an automatic signaling telegraph trunk having a magnetic relay telegraph repeater, a conductor extending from said repeater, connectable to another telegraph circuit, and a potentiometer connected to said conductor in said repeater so as to impose potential controls on said other circuit.

7. In a direct-current telegraph repeater, a telegraph line, a direct-current telegraph repeater connected to said line, a potential responsive transmission direction control circuit connected to said repeater to control transmission through said repeater, said circuit having a space discharge device therein as the potential responsive element, a magnetic relay trunk circuit, a conductor extending from said repeater operatively connectable either to a hub telegraph concentration group or to said trunk circuit and impedance means in said trunk for producing proper potentials, when said conductor is connected to said trunk in response to telegraph signals transmitted to said trunk, to control said control circuit, so as to form an operable telegraph channel between said line and said trunk.

8. In a direct-current telegraph system, a full-duplex direct-current telegraph repeater, a potential responsive transmission direction control circuit, a receiving leg and a sending leg extending from said repeater through said control circuit, said repeater, control circuit and legs constituting a two-way transmission unit connectable at a first time in a hub telegraph repeater concentration group, said control circuit including instrumentalities, including a space discharge device as the potential responsive element, for regulating the direction of transmission through said legs, a relay trunk circuit, a magnetic relay telegraph repeater in said trunk circuit, a receiving leg and a sending leg in said repeater in said trunk circuit, said legs in said unit connectable at a second time to said legs in said repeater in said trunk, and impedance means in each of said legs in said repeater in said trunk to develop proper potentials in response to signals transmitted between said repeaters, so as to form an operable telegraph channel between said full-duplex repeater and said trunk.

LELAND A. GARDNER.
WILTON T. REA.

References Cited in the file of this patent

UNITED STATES PATENTS

| Number | Name | Date |
|---|---|---|
| 1,852,051 | Hamilton | Apr. 5, 1932 |
| 2,473,346 | Richards | June 14, 1949 |
| 2,557,943 | Clemens | June 26, 1951 |
| 2,573,392 | Boughtwood | Oct. 30, 1951 |